(12) United States Patent
Kim

(10) Patent No.: US 8,816,542 B2
(45) Date of Patent: Aug. 26, 2014

(54) SLIM TYPE STATOR AND METHOD OF MAKING THE SAME, SLIM TYPE MOTOR HAVING THE STATOR, AND DIRECT DRIVE APPARATUS FOR DRUM-WASHING MACHINE

(75) Inventor: Byoung Soo Kim, Anyang-si (KR)

(73) Assignee: Amotech Co., Ltd. (KR)

( * ) Notice: Subject to any disclaimer, the term of this patent is extended or adjusted under 35 U.S.C. 154(b) by 534 days.

(21) Appl. No.: 13/166,138

(22) Filed: Jun. 22, 2011

(65) Prior Publication Data

US 2011/0316365 A1 Dec. 29, 2011

(30) Foreign Application Priority Data

Jun. 23, 2010 (KR) .................. 10-2010-0059703

(51) Int. Cl.
*H02K 5/08* (2006.01)
*H02K 3/28* (2006.01)
*H02K 1/18* (2006.01)
*H02K 3/52* (2006.01)
*H02K 5/22* (2006.01)
*H02K 1/14* (2006.01)

(52) U.S. Cl.
CPC .. *H02K 3/28* (2013.01); *H02K 1/14* (2013.01); *H02K 1/18* (2013.01); *H02K 3/524* (2013.01); *H02K 5/225* (2013.01)
USPC .................................. 310/43; 310/71; 310/194

(58) Field of Classification Search
CPC ...... H02K 3/522; H02K 2203/12; H02K 5/08
USPC ................ 310/43, 194, 71, 216.061, 216.135
See application file for complete search history.

(56) References Cited

U.S. PATENT DOCUMENTS

| | | | |
|---|---|---|---|
| 7,345,397 B2 * | 3/2008 | Sheeran et al. | 310/216.009 |
| 2002/0042957 A1 * | 4/2002 | Kim et al. | 8/158 |
| 2004/0007935 A1 * | 1/2004 | Kimura et al. | 310/254 |
| 2004/0164641 A1 * | 8/2004 | Yamada et al. | 310/218 |
| 2007/0145839 A1 * | 6/2007 | Kimura et al. | 310/68 B |
| 2007/0236099 A1 * | 10/2007 | Kim et al. | 310/266 |
| 2007/0252454 A1 * | 11/2007 | Hayashi et al. | 310/71 |

FOREIGN PATENT DOCUMENTS

| | | |
|---|---|---|
| KR | 10-2005-0000245 | 1/2005 |
| KR | 10-0663641 | 12/2006 |

* cited by examiner

*Primary Examiner* — Terrance Kenerly
(74) *Attorney, Agent, or Firm* — Cantor Colburn LLP

(57) ABSTRACT

A slim type stator includes: a number of division cores; a number of bobbins that partially surrounds the number of the division cores; an electric power terminal block on the outer portion of which a connector is provided in which external electric power is applied through the connector and that has terminal pins that are extended to the inside of the stator from the connector; a wiring box that is integrally formed with each bobbin and that mutually connects a stator coil with the terminal pins per phase; and a stator holder that mutually connects a number of division stator cores around which coils are wound with the outer circumference of the bobbins and supports the number of division stator cores.

10 Claims, 15 Drawing Sheets

SLIM TYPE STATOR AND METHOD OF MAKING THE SAME, SLIM TYPE MOTOR HAVING THE STATOR, AND DIRECT DRIVE APPARATUS FOR DRUM-WASHING MACHINE

CROSS-REFERENCE TO RELATED APPLICATION

This application claims the benefit of Korean Patent Application No. 10-2010-0059703, filed on Jun. 23, 2010, in the Korean Intellectual Property Office, the disclosure of which is incorporated herein by reference.

BACKGROUND OF THE INVENTION

1. Field of the Invention

The present invention relates to a slim type stator and motor, and more particularly, to a slim type stator, a method of making the same, a slim type motor having the same, and a direct drive apparatus for use in a drum-washing machine.

2. Description of the Related Art

In general, a drum-washing system performs washing using a frictional force between a rotating drum and washes according to a delivered motor drive force, at a state where a detergent, cleaning water, and washes are engaged in a drum, to thereby cause few damages of washes, and prevent washes from getting tangled, and provide an effect of washing washes by striking and rubbing the washes.

Conventional drum-washing machines are classified into an indirect drive system in which a drive force of a motor is transferred to a drum indirectly through a belt that is wound between a motor pulley and a drum pulley, and a direct drive (DD) system in which a shaft that is connected to a rotor of a brushless direct-current (BLDC) motor is connected directly to a drum, so that the motor drive force is immediately transferred to the drum.

Here, a belt-pulley drive system that does not transfer a drive force of a motor directly to a drum but transfers the motor drive force through a belt that is wound between a motor pulley and a drum pulley causes an energy loss during a transfer process of a drive force and generates much noise during a transfer process of power.

Therefore, to solve problems of such an existing drum-washing machine, use of a direct drive type drum-washing machine that uses a BLDC motor is being expanded.

Meanwhile, a core type BLDC motor has a structure that a magnetic circuit is symmetrical to a radial direction around an axis, and thus generates less axial vibratory noise. Accordingly, the core type BLDC motor is suitable for low speed rotation. In addition, a portion where a gap occupies for direction of a magnetic path is few in the case of the core type BLDC motor. Accordingly, the core type BLDC motor can get a high flux density even if magnets of a low magnetic performance are used or a quantity of magnets are reduced. As a result, the core type BLDC motor has advantages of a big torque and a high efficiency.

However, such a core structure, that is, a yoke structure may cause a material loss of a yoke when manufacturing a stator. In addition, a special expensive dedicated winding machine should be used in order to wind coil on the yoke due to a complex structure of the yoke when mass-producing. In addition, a mold investment cost is high at stator manufacturing to thus cause a high facility investment cost, in the case of the core type BLDC motor.

In the core type alternating-current (AC) or BLDC motor, especially the radial type core motor, it is a very important factor that decides competitive power of a motor to form the stator core into a perfect division type, since coil can be wound on division cores at a high efficiency using an inexpensive general-purpose winding machine. However, on the contrary, a low efficiency winding operation is performed using an expensive dedicated winding machine, in the case of an integrally built-in type stator core. Accordingly, a manufacturing cost of a motor is heightened in the case of the integrally built-in type stator core.

It may cause a problem that does not form a perfect magnetic circuit when the stator core is combined with a single rotor, to form the stator core into a perfect division type in order to get an effectiveness of coil winding, in the case of the radial type core motor.

Considering this point, a structure of greatly heightening productivity of stator assembly was proposed by the same applicant as this invention in the Korean Laid-open Patent Publication No. 2005-0000245, that includes: an annular core support plate that makes a number of division core assemblies on which coils are wound accommodated at a certain interval and supported in respective bobbins, and simultaneously a number of coils connected per phase; and an automatic position set/support unit that makes the division core assemblies automatically position set and supported at a certain interval.

In the case of the above-described motor, the core support plate 14 is arranged on the lower portion of the stator, to thus provide a connection space to connect between coils that are wound on a number of division stator cores. In addition, since an electric power terminal block for supplying electric power for motor coils is projected from a stator holder, the motor was produced thickly in which the whole thickness of the motor is about h=63 mm. Also, since a drum diameter of the drum-washing machine is as large as 220-260 mm in the case that the above-described motor is applied to a drum-washing machine, diameter of the annular core support plate should be also large in proportion to the drum diameter. As a result, the above-described motor is very disadvantageous in view of a manufacturing cost and an assembly of the annular core support plate.

Since the whole thickness of the motor is thick as described above, it is required in order to make the motor into a thin film structure that a number of stator cores on which coils are wound should be integrated by insert-molding using a thermosetting resin preferably without using the above-described annular core support plate.

Meanwhile, in the case of a large-size motor, a number of stator poles and a number of rotor poles are usually mixed. When the motor employs a division core system, a successive winding on cores of a number of group made of a number of division cores to then assemble the number of the division cores is desirable than an individual winding on a number of division cores to then assemble the number of the division cores, in view of assembly productivity.

The technology of manufacturing a motor by assembling a number of division cores without using any annular core support plate by this successive winding was disclosed in the Korean Patent Registration No. 663641 to the same applicant as that of this application.

Further, three-phase coils (U, V, and W) are connected with an electric power terminal block through three lead wires, in the case of the conventional motor for use in a washing machine. One end of the lead wires is connected to the terminal block by soldering, and the other ends of the lead wires are connected to one end of the respective three-phase coils (U, V, and W).

However, the lead wire connection structure between the electric power terminal block and the three-phase coils may cause the following defects. When the lead wires are insert-molded together with a number of cores at a state where the lead wires are soldered together with three-phase coils, the lead wires are flexible and thus do not maintain a constant shape. As a result, since it is difficult to fix the lead wires, an insert-molding work for integrating temporarily assembled division core assemblies is not smoothly performed, to thereby cause workability to be lowered. Due to these reasons, overall man-power required increases and a work efficiency is lowered. As well, a motor manufacturing cost is elevated and defective products may be caused.

SUMMARY OF THE INVENTION

To overcome inconveniences of the conventional art, it is an object of the present invention to provide a division core type slim type stator and a slim type motor having the same, in which three-phase coil terminals are mutually connected with fork pins of an electric power terminal block using a wiring box that is integrally formed in a bobbin of respective division cores, and then are insert-molded together with a number of the division cores, to thereby simplify a connection structure between the electric power terminal block and the three-phase coil terminals, to thus enhance workability, and to enable height of the entire stator to be made into a slim type.

It is another object of the present invention to provide a stator that can be manufactured in a slim type, and a method of making the same, in which coils are successively wound on a number of division stator cores per phase of U, V, and W, by using a special winding machine, to accordingly omit connection works between a number of division core assemblies on which coils are wound per phase, and a temporary assembly between adjoining division core assemblies is performed by using a coupling between bobbins, to thereby remove a PCB (Printed Circuit Board) for assembling the division cores.

It is still another object of the present invention to provide a stator that is designed by integrating a sensor PCB (Printed Circuit Board) holder with an electric power terminal block, to thereby enhance an assembly performance.

It is yet another object of the present invention to provide a direct drive (DD) apparatus for drum-washing machines that is mounted in an allowable space without reducing size of a tub related to a laundry capacity in a drum-washing machine, to thereby make a basket in the inside of the tub rotationally driven in a direct drive method.

To achieve the objects, according to an aspect of the present invention, there is provided a slim type stator for use in a brushless direct-current (BLDC) motor, the slim type stator comprising:

a number of division cores;

a number of bobbins that partially surrounds the number of the division cores;

an electric power terminal block on the outer portion of which a connector is provided in which external electric power is applied through the connector and that has terminal pins that are extended to the inside of the stator from the connector;

a wiring box that is integrally formed with each bobbin and that mutually connects a stator coil with the terminal pins per phase; and a stator holder that mutually connects a number of division stator cores around which coils are wound with the outer circumference of the bobbins and supports the number of division stator cores.

According to another aspect of the present invention, there is provided a slim type stator for use in a brushless direct-current (BLDC) motor, the slim type stator comprising:

a division stator core assembly in which coils are successively wound in a number of bobbins that are alternately disposed per phase on respective outer circumferences of a number of division cores of which the bobbins are formed and a coupling groove and a coupling protrusion are combined with each other between adjoining division core bobbins and assembled in an annular form;

a stator holder that supports the division stator core assembly by mutually connecting resin; and an electric power terminal block that is insert-molded together with the stator holder at a state where one end of the electric power terminal block is connected to an output terminal of each coil per phase, respectively, and whose other end is exposed to the outside of the stator holder.

Preferably but not necessarily, a wiring box into which the output terminal of each coil is inserted is integrally formed with each bobbin, the electric power terminal block comprises a number of terminal pins whose one ends are detachably connected with external power supply terminals and on the other ends of which fork pins are formed, and each fork pin of the number of the terminal pins is inserted into the wiring box into which the output terminal of each coil has been inserted, and is connected with the output terminal of each coil per phase.

Preferably but not necessarily, the coils per phase that are inserted into the wiring box are fixed by inserting mag mate terminals into the wiring box, respectively, and the fork pins are pressingly fitted into the mag mates to then be electrically connected to each coil.

Preferably but not necessarily, the slim type stator for use in a brushless direct-current (BLDC) motor further comprises a sensor printed circuit board (PCB) holder that is detachably combined with part of the stator holder and that comprises a number of Hall sensors.

Preferably but not necessarily, the sensor printed circuit board (PCB) holder comprises a number of snap protrusions that are snap-connected with coupling holes that are formed in the stator holder.

According to another aspect of the present invention, there is provided a slim type stator for use in a brushless direct-current (BLDC) motor, the slim type stator comprising:

a division stator core assembly in which coils are successively wound in a number of bobbins that are alternately disposed per phase on respective outer circumferences of a number of division cores of which the bobbins are formed and a coupling groove and a coupling protrusion are combined with each other between adjoining division core bobbins and assembled in an annular form;

a stator holder that supports the division stator core assembly by mutually connecting resin; and a sensor printed circuit board (PCB) holder that is detachably combined with the stator holder and comprises a sensor printed circuit board (PCB) on which a number of Hall sensors and a Hall sensor assembly are mounted, as well as an electric power terminal block whose one end is connected to a coil per phase.

Preferably but not necessarily, a wiring box into which the output terminal of each coil is inserted is integrally formed with each bobbin, and the electric power terminal block comprises: a number of first terminal pins that are detachably connected with external electric power terminals therein; and a number of second terminal pins that are buried into the stator holder and whose leading end portions are connected with a number of fork pins that are inserted into a wiring box so as to be connected to one end of a coil per phase.

Preferably but not necessarily, the number of the first and second terminal pins are mutually connected through the sensor PCB, respectively.

Preferably but not necessarily, the stator is used for a motor having a double rotor-single stator structure.

Preferably but not necessarily, the motor is used for a direct drive apparatus for directly driving a basket of a drum-washing machine.

According to another aspect of the present invention, there is provided a direct drive apparatus for use in a drum-washing machine, the direct drive apparatus comprising:

a rotating shaft that is rotatably combined with a tub of the drum-washing machine and on the leading end of which a basket is fixedly combined;

a double-rotor unit comprising inner and outer rotors in which a number of N-pole and S-pole magnets are respectively disposed, the inner and outer rotors being mutually connected by a rotor holder, and whose inner circumference is extensively formed in a bushing combined with the rotating shaft; and a stator whose one end is disposed between the inner rotor and the outer rotor and whose other end is mounted in the tub, in which coils are successively wound per phase in a number of bobbins that are formed on respective outer circumferences of a number of division cores and mutually connected between adjoining bobbins, and terminal pins of an electric power terminal block are connected with an output terminal of each coil per phase by using a wiring box that is provided in each bobbin.

Preferably but not necessarily, the stator comprises a stator holder that mutually connects a number of division stator cores around which coils are wound with the outer circumference of the bobbins, and the stator holder comprises a number of protrusions that are axially extended so that a number of bolt engagement holes that are used to engage fixing bolts at the time of being assembled with the tub and a number of guide protrusions for guiding an assembly position are alternately formed at intervals.

Preferably but not necessarily, the stator comprises
a number of division cores;
a number of bobbins that partially surrounds the number of the division cores;
an electric power terminal block on the outer portion of which a connector is provided in which external electric power is applied through the connector and that has terminal pins that are extended to the inside of the stator from the connector;
a wiring box that is integrally formed with each bobbin and that mutually connects a stator coil with the terminal pins per phase; and
a stator holder that mutually connects a number of division stator cores around which coils are wound with the outer circumference of the bobbins and supports the number of division stator cores.

Preferably but not necessarily, the stator comprises
a number of division cores;
a number of bobbins in which each bobbin comprises first and second flanges that are formed on the outer circumference of each of the number of division cores and surround a middle portion thereof, and formed at one side of the bobbin and the other side thereof, respectively, and
a coupling protrusion and a coupling groove that are provided in both side ends of the first flange that is disposed in the inside thereof during assembling, and are mutually connected between adjoining division stator core bobbins and are disposed in an annular form;

a three-phase coil (U, V, and W) that is consecutively wound on the bobbin of each phase that is alternately arranged per phase (U, V, and W); and a stator holder that is molded in an annular form by an insert molding that uses a thermosetting resin, except for inner/outer surfaces of each division core of a division stator core assembly that is assembled by winding the coils on the number of the bobbins.

Preferably but not necessarily, the rotor holder comprises:
a pair of annular frames that surround the outer circumference portions of the number of magnets in the inner rotor and the outer rotor, respectively;
a number of linear frames that cross the pair of the annular frames and are radially extended in a straight line to the center portion of the rotor; and
a bushing holder that holds a bushing therein and with the outer circumference portion of which leading ends of the linear frames are connected.

According to another aspect of the present invention, there is provided a slim type motor comprising:
a rotating shaft that is rotatably combined with a housing of an apparatus and on the leading end of which a driven object is fixedly combined;
a double-rotor unit comprising inner and outer rotors in which a number of N-pole and S-pole magnets are respectively disposed, the inner and outer rotors being mutually connected by a rotor holder, and whose inner circumference is extensively formed in a bushing combined with the rotating shaft; and
a stator whose one end is disposed between the inner rotor and the outer rotor and whose other end is mounted in the tub, in which coils are successively wound per phase in a number of bobbins that are formed on respective outer circumferences of a number of division cores and mutually connected between adjoining bobbins, and terminal pins of an electric power terminal block are connected with an output terminal of each coil per phase by using a wiring box that is provided in each bobbin.

Preferably but not necessarily, each bobbin of the stator comprises:
first and second flanges that are formed on the outer circumference of each of the number of division cores and surround a middle portion thereof, and are formed at one side of the bobbin and the other side thereof, respectively;
a coupling protrusion and a coupling groove that are mutually connected between adjoining division stator core bobbins and are assembled in an annular form, at the time of assembling in both side ends of the first flange that is disposed in the inside thereof, and
a wiring box that is integrally formed at the upper side of the first flange and mutually connects the stator coil and the terminal pin per phase.

Preferably but not necessarily, the rotor holder comprises:
a pair of annular frames that surround the outer circumference portions of the number of magnets in the inner rotor and the outer rotor, respectively;
a number of linear frames that cross the pair of the annular frames and are radially extended in a straight line to the center portion of the rotor; and
a bushing holder that holds a bushing therein and with the outer circumference portion of which leading ends of the linear frames are connected, and wherein a number of throughholes playing a role of air circulation paths are formed between the pair of the annular frames and the bushing holder in which the space between the pair of the annular frames and the bushing holder is divided by the number of the linear frames.

According to another aspect of the present invention, there is provided a method of manufacturing a slim type stator for use in a brushless direct-current (BLDC) motor, the slim type stator manufacturing method comprising the steps of:

integrally molding a number of bobbins each comprising first and second flanges that are formed on the outer circumference of each of a number of division cores and surround a middle portion thereof, in which a coupling protrusion and a coupling groove are provided at both side ends of the first flange;

preparing a coil assembly per phase made of a number of division stator cores in which each coil per phase is sequentially successively wound between the first and second flanges of each of the number of the bobbins so that the coils are wound on the number of the bobbins;

preparing an annular division stator core assembly in which the number of the coil-wound division stator cores are alternately disposed per phase, and the coupling protrusion and the coupling groove that have been formed in adjoining stator core bobbins are mutually connected;

inserting the each phase coil into a wiring box of the bobbin whose coil output terminal is assigned per phase and fixing the phase coil in the wiring box through a mag mate terminal;

pressingly fitting a number of fork pins that are formed at one end of an electric power terminal block into the mag mate terminal that has been inserted into the wiring box; and preparing an integral stator in which each division core of the division stator core assembly is molded in an annular form except for inner/outer surfaces of each division core, wherein part of the electric power terminal block is molded together at the time of molding the stator.

Advantageous Effects

As described above, according to the present invention, lead wires are omitted when three-phase coils are connected with an electric power terminal block and the three-phase coils are directly connected with fork pins of the electric power terminal block using a wiring box that is formed integrally with a bobbin of respective division cores. Accordingly, connection between the three-phase coils and the electric power terminal block facilitates. In addition, since the electric power terminal block is insert-molded together with a number of division cores, a molding work that has been difficult due to conventional flexible lead wires can smoothly proceed, to thus greatly improve a workability.

In addition, according to the present invention, a number of division cores are temporarily assembled by continuous windings of the division cores and mutual link connections formed in bobbins without using separate core support plates. Then, a number of division cores assemblies are injection-molded using thermosetting resins in an insert-molding manner, to thus significantly increase a productivity.

Furthermore, the present invention provides a direct drive (DD) apparatus that is employed in a drum-washing machine, in which the direct drive (DD) apparatus is mounted in an allowable space without reducing the size of a tub associated with a washing capacity the drum-washing machine, to thereby make an internal basket in the tub driven to rotate in a direct drive manner.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Hereinbelow, a slim type stator, a method of making the same, a slim type motor having the same, and a direct drive apparatus for use in a drum-washing machine will be described with reference to the accompanying drawings.

A slim type motor according to an embodiment of this invention is adapted to be employed in a narrow motor installation space in a direct drive apparatus for use in a drum-washing machine (or a full automatic washing machine) or another apparatus that needs a motor.

First of all, the slim type motor according to the embodiment of this invention employs a double rotor structure that does not reduce size of magnets, in comparison with the conventional art, considering a coil winding workability by perfect division of a stator core. As a result, a magnetic circuit of the motor is designed into a double-rotor/single-stator structure that circulates an "inner rotor-division core-outer rotor-adjoining division core".

In addition, a stator according to an embodiment of this invention is of a division core structure that can be manufactured in a slim type, in order to obtain a slim thickness, in which coils are successively wound on a number of division stator cores per phase of U, V, and W, to accordingly omit connection works between a number of division core assemblies on which coils are wound per phase, and a temporary assembly between adjoining division core assemblies is performed by using a linkage coupling between bobbins in order to perform a molding work with a thermosetting resin, without using any PCB (Printed Circuit Board) or supporter necessary for assembling the division cores.

In general, as the number of poles of a motor becomes large, the number of rotations (rpm) becomes low, as in the present invention. The drum-washing machine does not require a high number of rotations (rpm). However, the smaller number of coils are wound on respective stator cores.

In addition, the present invention does not use any special terminal assembly holders that are needed for coupling three-phase coil terminals with an electric power terminal block but couples the three-phase coil terminals with fork pins of the electric power terminal block using a wiring box that is formed integrally with a bobbin of respective division cores. Then, the electric power terminal block is insert-molded together with a number of division cores, to thereby slim height of the stator and reduce the number of components, and to thus improve an assembly performance.

Further, the present invention couples the electric power terminal block directly with the three-phase coils and insert-molds the electric power terminal block together with a number of division cores, to thereby improve a workability and lower a production cost.

Hereinbelow, preferred embodiments of the present invention will be described in detail with reference to the accompanying drawings.

A. Overall Structure of the Motor

Figure 1:
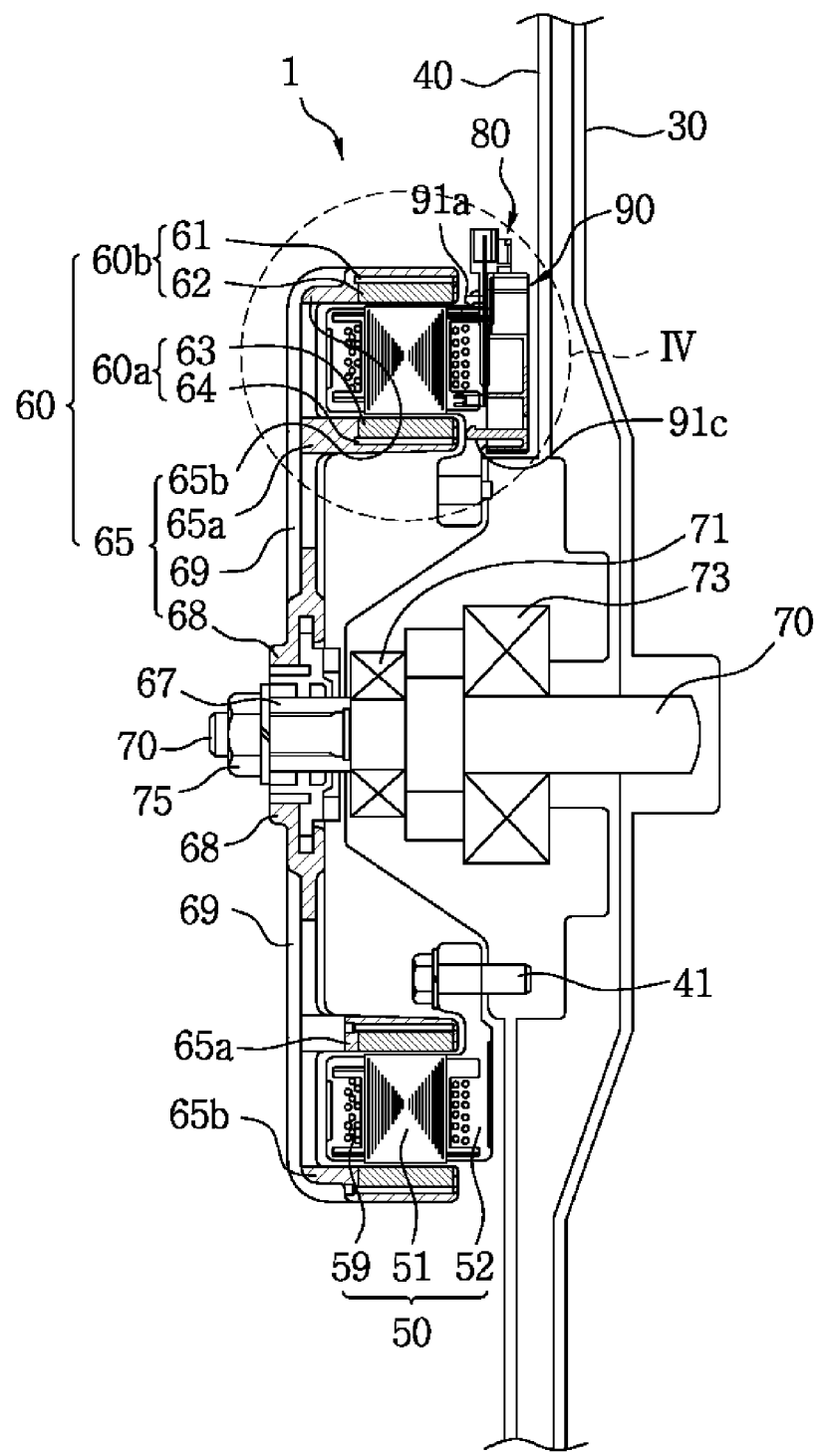
FIG. 1 is a cross-sectional view showing a slim type motor that has been cut along the axial direction thereof according to an embodiment of the present invention.
Figure 4:
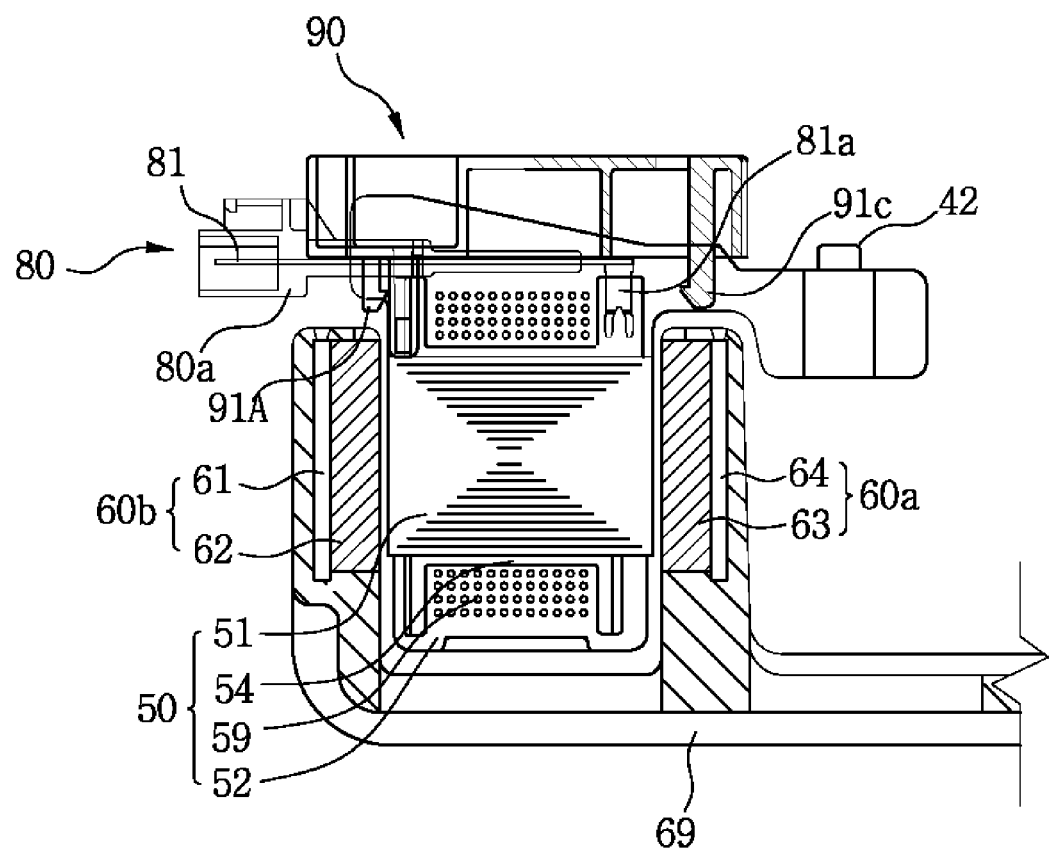
FIG. 4 is an enlarged view showing a portion "IV" of FIG. 1.

FIG. 1 is a cross-sectional view showing a slim type motor that has been cut along the axial direction thereof according to an embodiment of the present invention, and FIG. 4 is an enlarged view showing a portion "IV" of FIG. 1.

Referring to FIGS. 1 and 4, for example, a slim type motor 1 according to the present invention is installed in a direct drive manner in a tub 40 of a drum-washing machine to then be used to rotationally drive a basket 30 that is positioned in the drum-washing machine in a forward/backward direction. In addition, the slim type motor 1 of FIG. 1 has been applied for the drum-washing machine as an example, but may be also applied to drive an inner tub for a full automatic drum-washing machine other than the drum-washing machine.

The slim type motor 1 according to this invention includes: a stator 50; a rotor 60; and a rotating shaft 70.

The stator 50 is integrally formed by an annular stator holder 52 that is manufactured by winding coils 59 on the outer circumference of respective bobbins 54 and then insert-molding a number of division stator cores 51 using a thermosetting resin.

The rotor 60 includes: an inner rotor 60a in which a number of magnet 63 and a ring-shaped yoke 64 are disposed in an annular form, with a predetermined magnetic gap in the inner and outer circumference portions of the stator 50; an outer rotor 60b in which a number of magnets 62 and a ring-shaped outer yoke 61 are disposed in an annular form; and a rotor support frame 65 that mutually connects one end of the inner rotor 60a and one end of the outer rotor 60b and is extended to the central portion of the rotor to then be combined with an involute serration bushing 67.

The rotating shaft 70 is combined with the rotor 60 at the central portion of the rotor 60, for example, through the involute serration bushing 67, in which one end of the rotating shaft 70 is fixed by a fixing nut 75 and the other end thereof is rotatably supported through at least one pair of bearings 71 and 73 that are installed on the rear surface of the tub 40.

In this case, the stator 50 is formed by integrally molding a number of division stator cores 51 that have been perfectly divided in an annular form by an annular stator holder 52. The stator holder 52 is extended inwards and supported to the tub 40 of the washing machine by a fixing bolt 41.

In this case, the bearings 71 and 73 rotatably support the double rotor 60 that is combined to the rotating shaft 70 through the bushing 67. The leading end of the rotating shaft 70 is extended into the tub 40 of the washing machine and fixedly combined with a basket 30. Thus, the basket 30 rotates according to rotation of the rotating shaft 70.

Therefore, the inner rotor 60a and the outer rotor 60b of the double rotor 60 are attached on the inner and outer side surfaces of inner and outer yokes 64 and 61 that are formed of a number of magnets 63 and 62 in an annular form, respectively. The built-in type stator 50 including a number of division stator cores 51 is inserted into an annular space between the double rotor 60.

In this case, a divided and magnetized ring-shaped magnet may be used as the inner rotor 60a and the outer rotor 60b, instead of the division type magnets 63 and 62.

Therefore, the motor 1 according to the present invention is formed of a radial core type motor that is composed of the double rotor 60 in which the inner rotor 60a and the outer rotor 60b are supported to the rotor support frame 65 and the single stator 50.

B. Structure of Stator and Process of Manufacturing the Stator

Figure 2A:
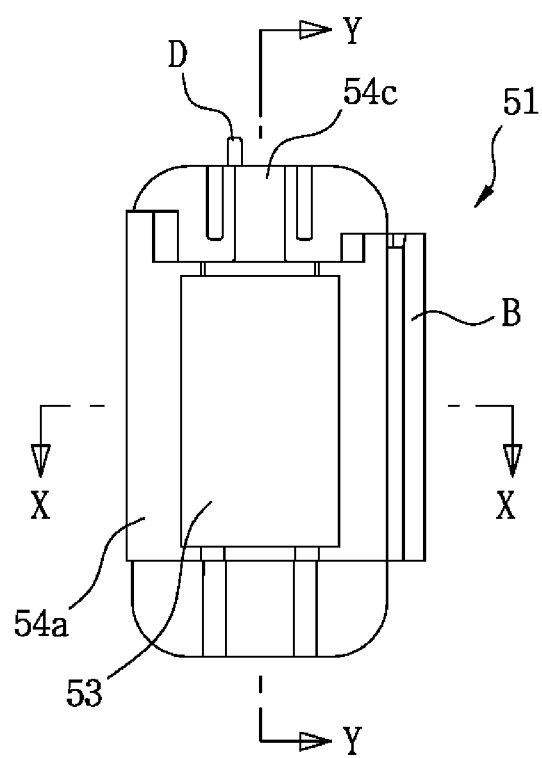
FIG. 2A is a front view of a division stator core according to the present invention.
Figure 2B:
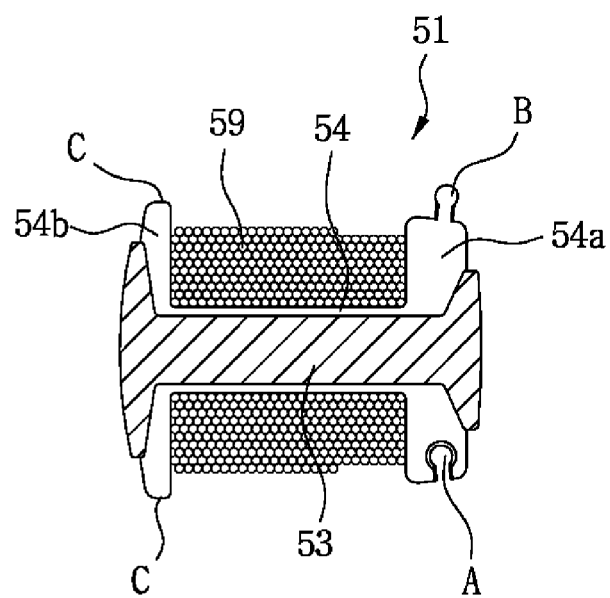
FIG. 2B is a cross-sectional view cut along a line X-X of FIG. 2A.
Figure 2C:
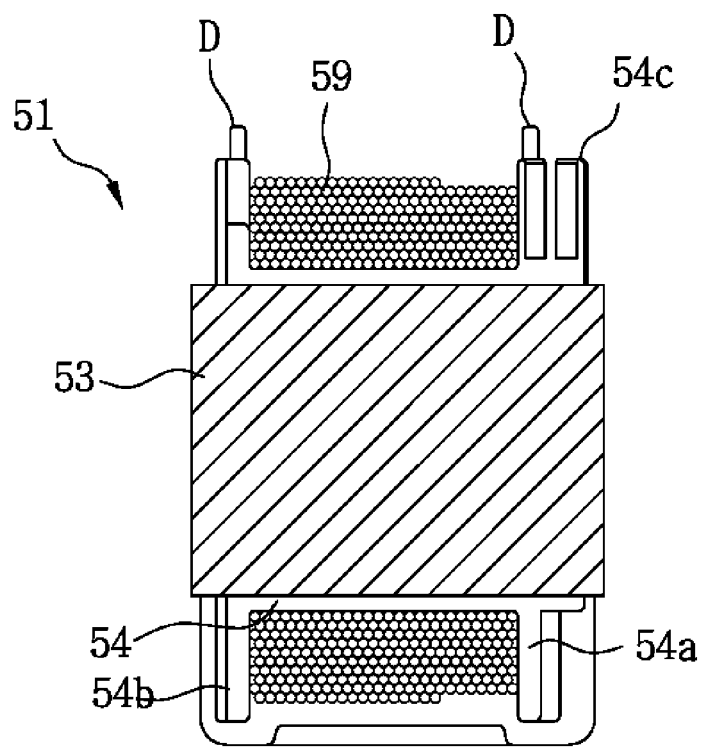
FIG. 2C is a cross-sectional view cut along a line Y-Y of FIG. 2A.
Figure 3:
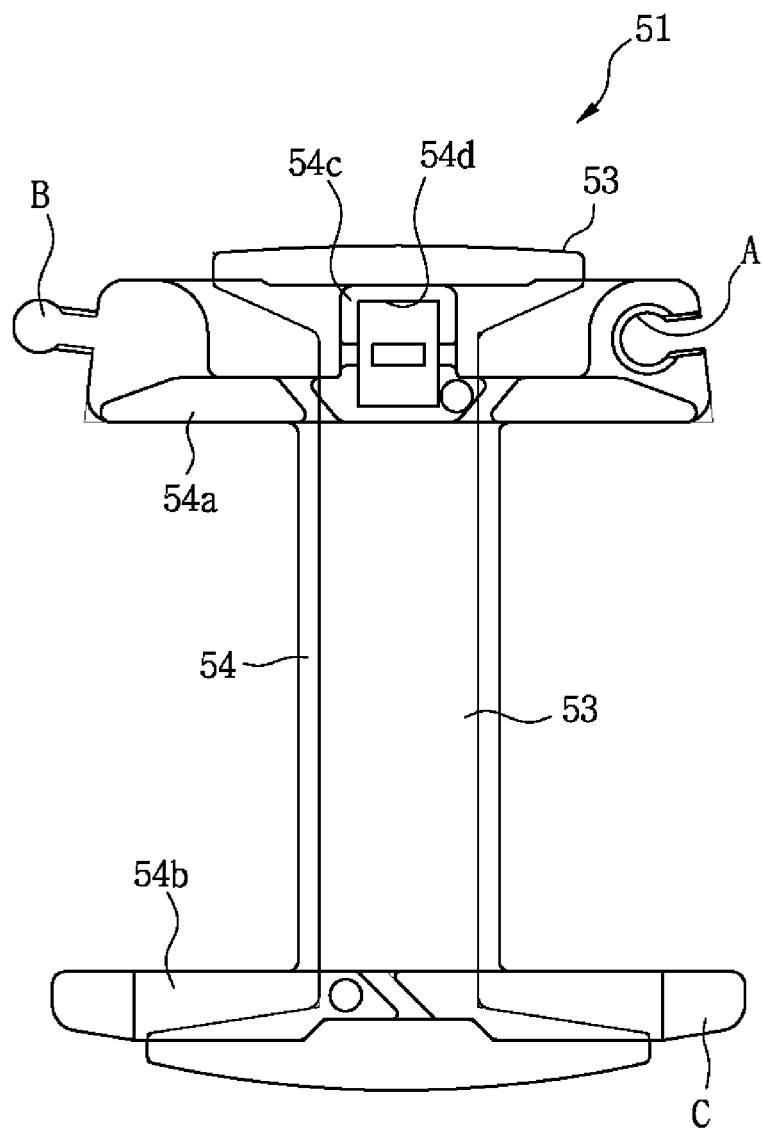
FIG. 3 is a plan view of the division stator core shown in FIG. 2A.

FIG. 2A is a front view of a division stator core according to the present invention, FIG. 2B is a cross-sectional view cut along a line X-X of FIG. 2A, and FIG. 2C is a cross-sectional view cut along a line Y-Y of FIG. 2A. FIG. 3 is a plan view of the division stator core shown in FIG. 2A.

Referring to FIGS. 2A, 2B, 2C and 3, a number of division stator cores 51 may be formed by winding a coil 54 on the outer circumference of a bobbin 54 at a state of integrally forming the insulation bobbin 54 surrounding an i-shaped division core 53 that is disposed therein, and to then be assembled in an annular form, and then insert-molding the outer side surfaces of the number of the division stator cores 51 using a thermosetting resin, to thereby obtain an annular built-in type stator 50.

Copper (Cu) is usually used as a material of the coil. However, aluminum (Al) whose specific gravity is one third in comparison with Cu and whose price is relatively inexpensive can be used, in order to reduce weight of the motor. In general, it is hard to apply aluminum (Al) as a motor coil because an oxidation problem occurs in aluminum. However, such an oxidation problem does not occur in the present invention since the outer portions of stator core assemblies on which coils are wound are coated by using the thermosetting resin.

Also, the division core 53 can be used by laminating a number of silicon steel plates or sintering a soft magnetic compound whose magnetic permeability is high and whose electrical resistance is high, in order to prevent a magnetic flux from being lost by an eddy current that can be generated at the time of rotation of a motor.

The I-shaped bobbin 54 that is obtained by molding the I-shaped division core 53 is composed of an intermediate rectangular vessel portion on which a coil 59 is wound, and inner and outer flanges 54a and 54b that are bent and extended at the inner and outer portions of the rectangular vessel portion, respectively. The rectangular vessel portion formed between the inner and outer flanges 54a and 54bs provides a space on which a coil is wound. Here, it is preferable that the inner and outer flanges 54a and 54bs of the bobbin 54 should be formed so that the outer flange 54b is formed relatively larger than the inner flange 54a.

The division stator core 51 includes a coupling groove A and a coupling protrusion B that are perpendicularly formed on both sides thereof to be coupled between the inner circumferences of the inner flange 54a so that a number of the division stator cores 51 can be assembled in an annular form at a later time. The outer circumference of the outer flange 54b is formed to come in contact with circumference forming surfaces C of the outer flange 54b.

Figure 6:
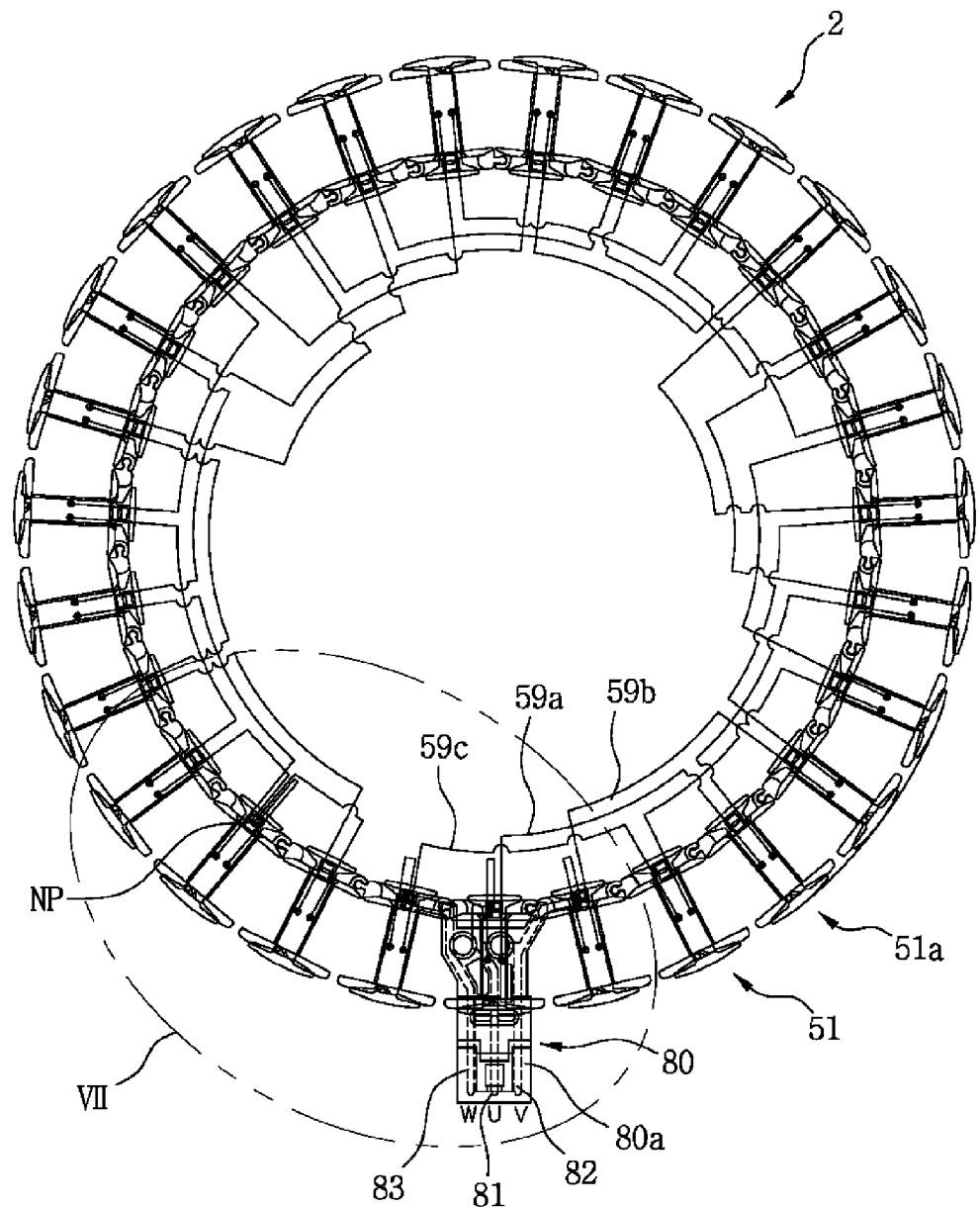
FIG. 6 is a view for explaining a coupling state of the division stator cores and an arrangement and connection state of coil windings of a three-phase drive method of FIG. 2A.

In addition, a wiring box 54c in which a coil coupling groove 54d is formed is integrally formed on the upper end of the inner flange 54a. As shown in FIG. 6, the wiring box 54c forms a neutral point (NP) into which any one coil end of three-phase coils 59a-59c is inserted or the other end of the three-phase coils 59a-59c is inserted all at a time.

Referring to FIG. 2B, it can be seen that the I-shaped division core 53 is inserted into the inside of the division stator core 51, and the bobbin 54 that surrounds the outer circumference portion of the core is formed along the outer circumference portion of the core. The coupling groove A and the coupling protrusion B are formed in the inner flange 54a of the bobbin 54, and the circumference forming surfaces C are formed in the outside flange 54b thereof.

It is preferable that an assembly between the I-shaped division core 53 and the bobbin 54 is integrally formed by an insert-molding method that uses a thermosetting resin, but is not limited thereto. That is, the assembly between the I-type division core 53 and the bobbin 54 may be assembled by another known method.

A method of manufacturing an annular built-in type stator 50 by assembling a number of division stator cores 51 will be described below.

Figure 7A:
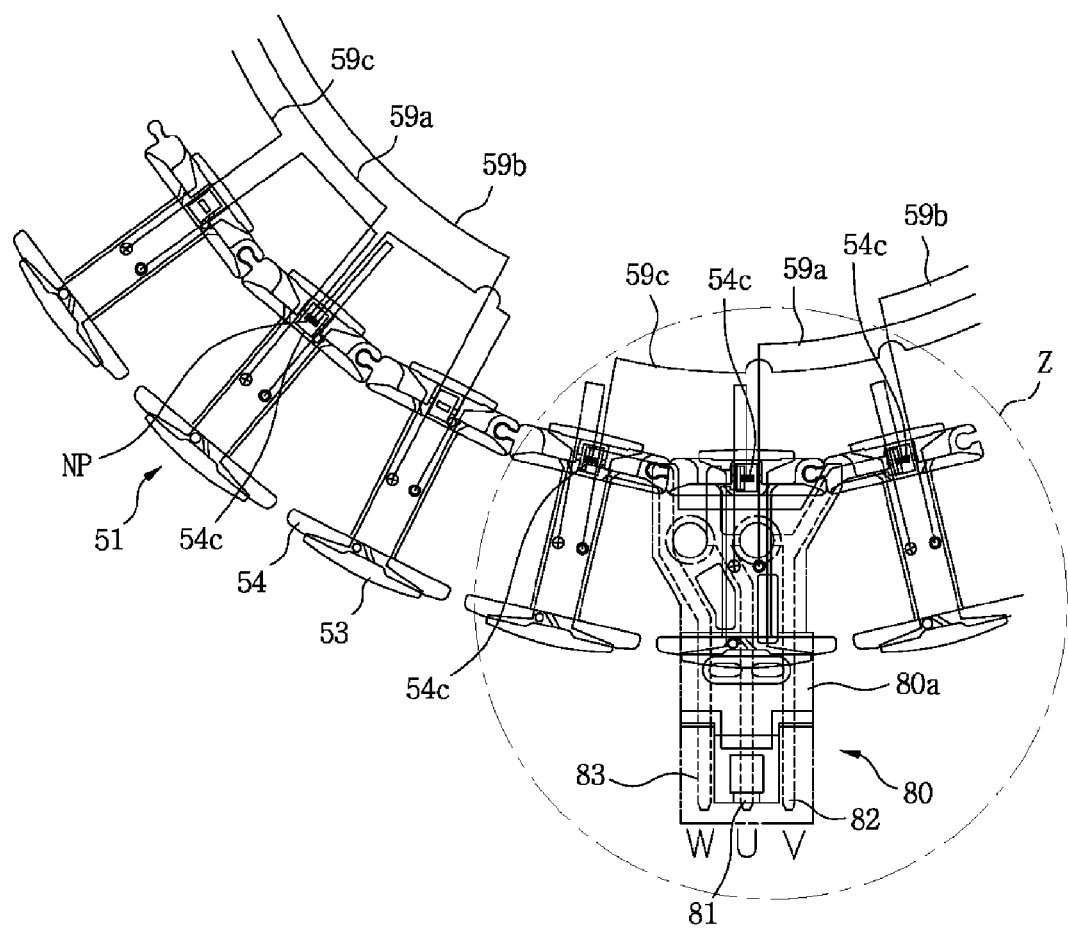
FIG. 7A is an enlarged view showing a portion "VII" of FIG. 6.
Figure 7B:
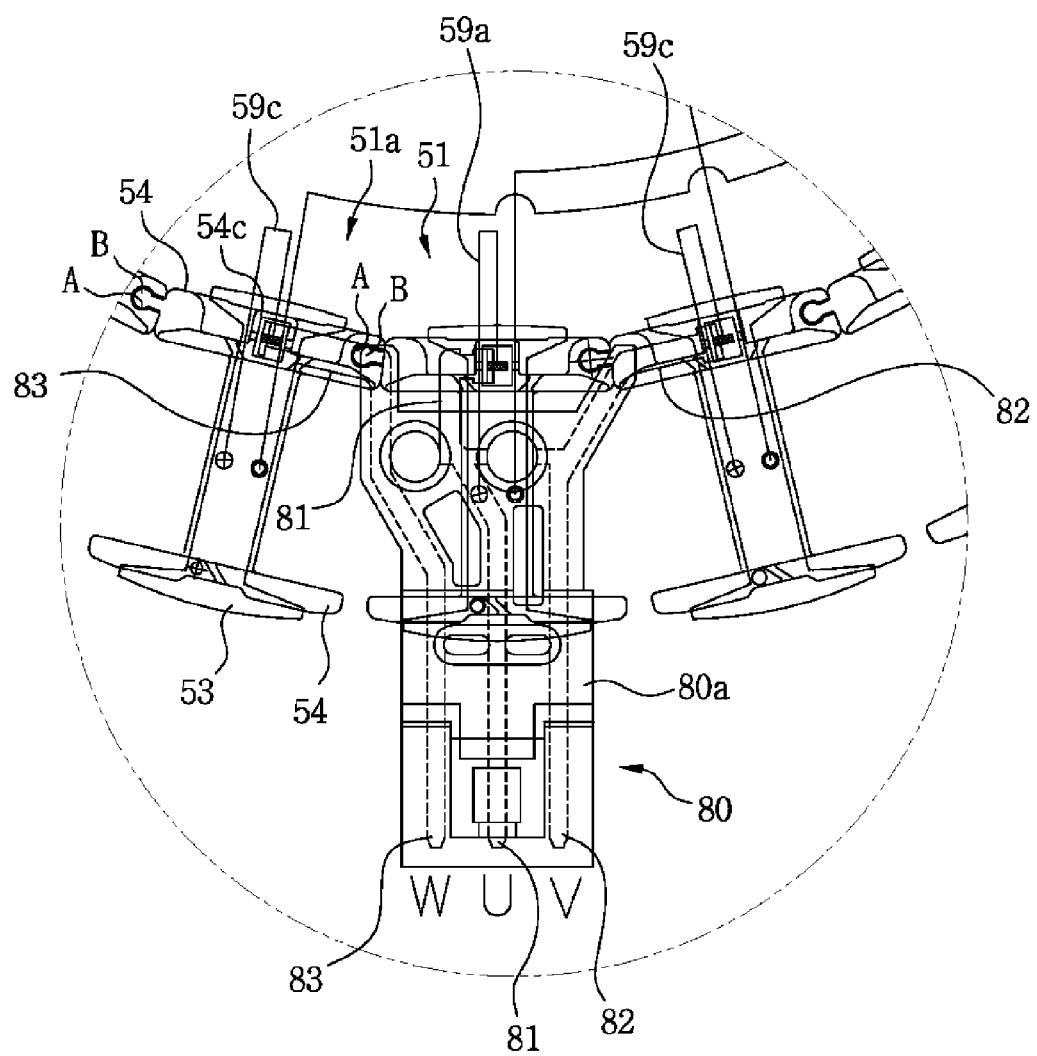
FIG. 7B is an enlarged view showing a portion "Z" of FIG. 7A.

FIG. 6 is a perspective view for explaining a coupling state of the division stator core of FIG. 2A, and windings, arrangement and connections of the coils of a three-phase drive system, FIG. 7A is an enlarged view showing a portion "VII" of FIG. 6, and FIG. 7B is an enlarged view showing a portion "Z" of FIG. 7A.

Hereinbelow, for convenience of explanation, states that coils are not wound on the division stator cores have been illustrated, but it is apparent that coils of three phases (U, V, and W) should be wound on the division stator cores at the time of actually manufacturing the stator 50 by an insert-molding method.

Referring to FIGS. 6, 7A and 7B, a coupling groove "A" is formed at one side of the inner flange 54a of a bobbin 54 of each division stator core 51, and a coupling protrusion "B" is formed at the other side thereof. The circumference forming surfaces "C" are formed in the outside flange 54b thereof. The inner circumference surface of each division stator core 51 is formed as the coupling protrusion "B" of the division stator core 51 is coupled with the coupling groove "A" of the adjoining division stator core 51a. If the inner circumference surfaces of the adjoining division stator cores 51 and 51a are coupled with each other, the circumference forming surfaces "C" of two division stator cores 51 and 51a come in contact with each other to thus form an outer circumference surface.

In this manner, if the coupling protrusion and the coupling groove A of the bobbin 54 in each division stator core 51 are consecutively mutually coupled with each other, a division stator core assembly 2 is completed as illustrated in FIG. 6.

Hereinbelow, a method of manufacturing the stator 50 will be described.

In this invention, in the case that the stator 50 employs a three-phase drive system, a successive winding is performed per each phase (U, V, or W) as a coil winding for a number of division stator cores. In the case that a magnetic circuit of a motor is formed of a 27-slot-24 (or 36)-pole structure, for example, respective coils 59a-59c corresponding to three phases (U, V, and W) are successively wound on the nine division stator cores for each phase of U, V, and W, to thereby omit a connection work between the division stator cores on which the coils are wound per phase.

Then, the twenty-seven division stator cores on which coils are wound are alternately arranged per each phase of U, V, and W as shown in FIG. 6 and coupling grooves A and coupling protrusions B of respective bobbins 54 for the adjoining division stator cores are mutually coupled with each other as shown in FIG. 6, to thereby complete a division stator core assembly 2.

Thereafter, as shown in FIGS. 7A and 7B, one-end terminals of the coils 59a-59c that are wound on the division stator core assembly 2 are connected with the electric power terminal block 80, and the other-end terminals of the coils 59a-59c are connected together with one another, to thus form a neutral point (NP).

Figure 8:
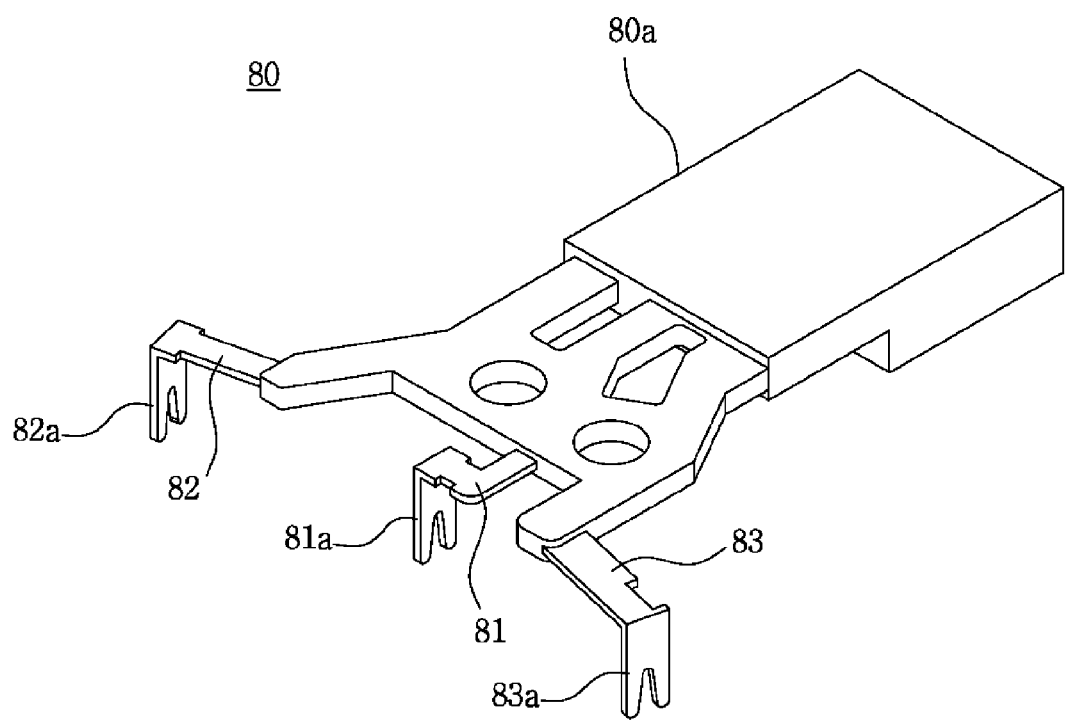
FIG. 8 is a perspective view for explaining an electric power terminal block shown in FIG. 7A.
Figure 9:
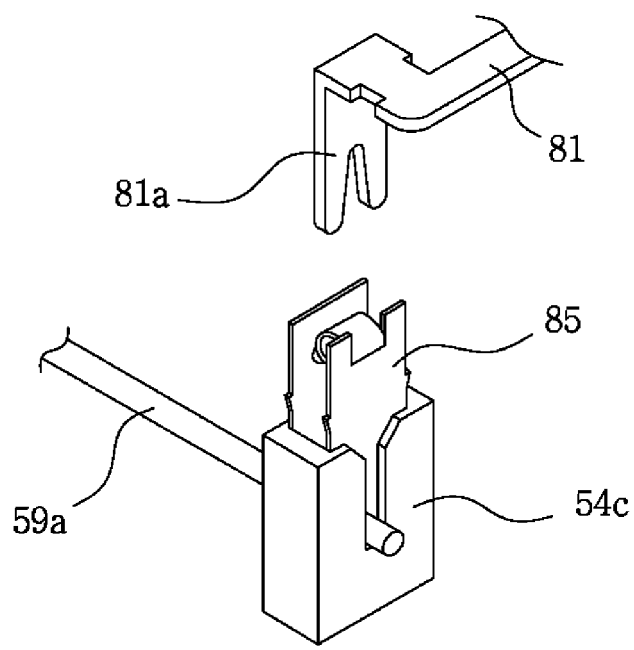
FIG. 9 is a perspective view showing a structure that fork pins of an electric power terminal block are connected to a mag mate terminal that is pressingly inserted into a wiring box together with one end of a coil.
Figure 10:
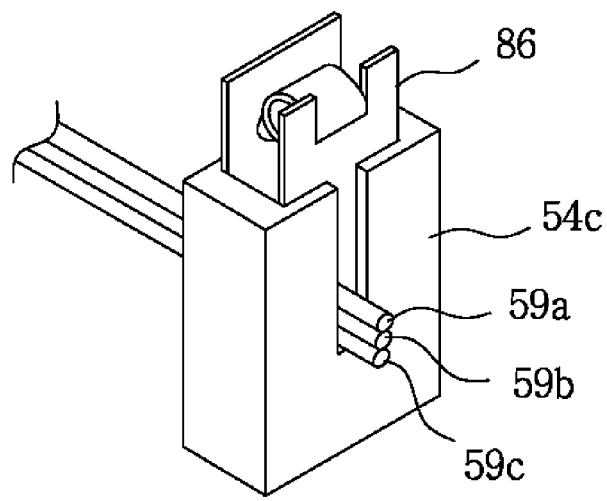
FIG. 10 is a perspective view for explaining a common terminal that forms a neutral point (NP) of FIG. 6.

FIG. 8 is a perspective view for explaining an electric power terminal block shown in FIG. 7A. FIG. 9 is a perspective view showing a structure that fork pins of an electric power terminal block are connected to a mag mate terminal that is pressingly inserted into a wiring box together with one end of a coil. FIG. 10 is a perspective view for explaining a common terminal that forms a neutral point (NP) of FIG. 6.

Referring to FIG. 8, the electric power terminal block 80 includes a body 80a in which three terminal pins 81, 82, and 83 that are respectively made of a metal body are injection-molded with a resin in an insert-molding manner. The three terminal pins 81, 82, and 83 are buried into the inner side of the body 80a of the electric power terminal block 80 from the leading end of the body 80a to the rear end thereof.

Figure 11:
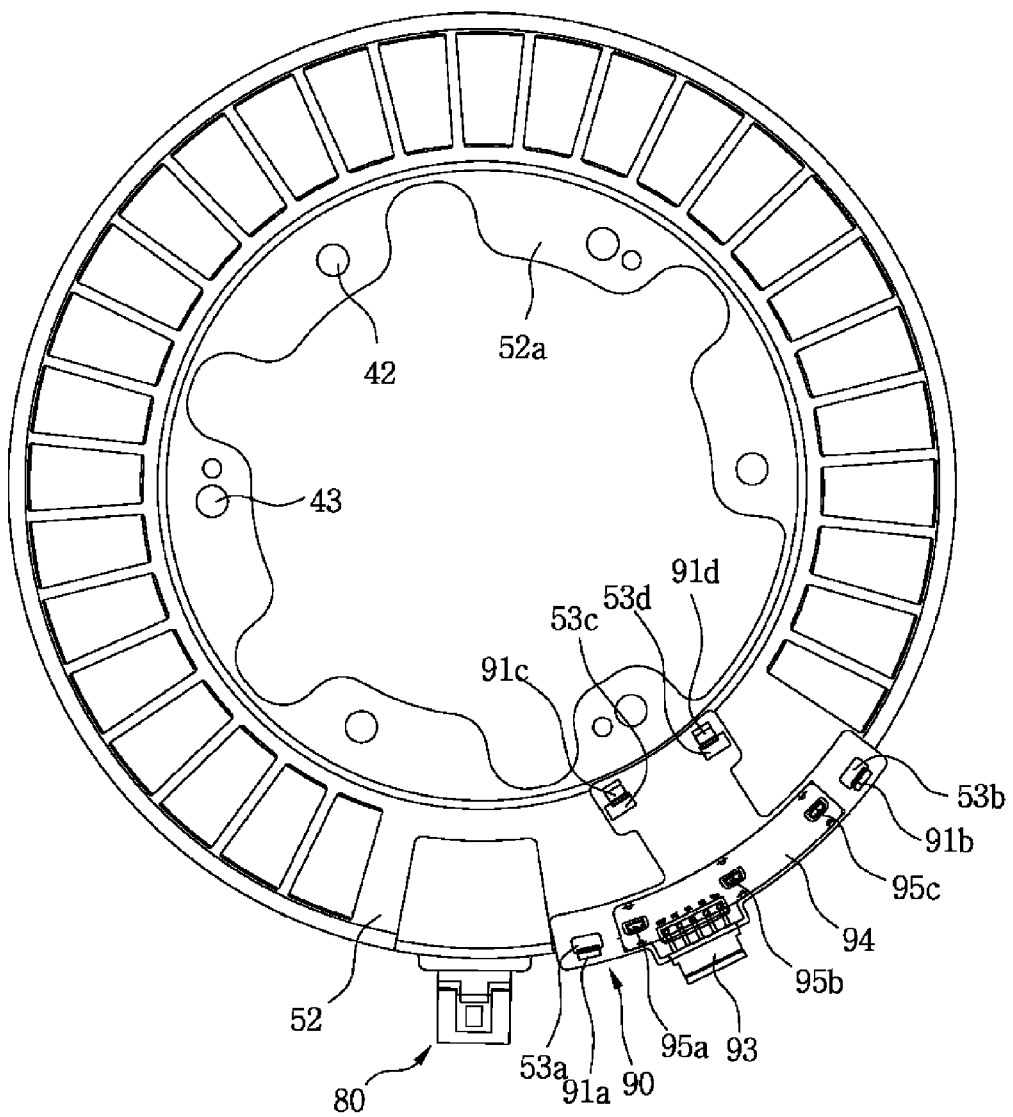
FIG. 11 is a plan view showing a state where a sensor printed circuit board (PCB) holder is combined with a stator.

As shown in FIG. 11, an electric power connector that is exposed to the outside and receives a three-phase electric power from a main body of a washing machine is integrally formed in the leading end of the electric power terminal block 80.

The respective rear ends of the terminal pins 81, 82, and 83 protrude by a predetermined length from the rear end of the electric power terminal block 80. The left and right terminal pins 83 and 82 are extended at a bent state of a predetermined angle so that the three terminal pins 81, 82, and 83 are simultaneously connected with a wiring box 54c that is formed in a three-core bobbin 54 that is assembled to be connected with the three-phase (U-, V-, and W-phase) coils, respectively. In this case, fork pins 81a, 82a, and 83a that are respectively vertically bent are extended from the respective rear ends of the terminal pins 81, 82, and 83.

The fork pins 81a, 82a, and 83a are respectively fitted into a mag mate terminal 85 that is inserted into the wiring box 54c that is integrally formed on top of the inner flange 54a, to thus be electrically connected with the three-phase coils 59a-59c. The mag mate terminal 85 is made in a substantially "U" shape, and includes a resilient clip whose one side leading end portion is bent inwards.

Referring to FIG. 9, a connection structure will be described below. At first, a U-phase coil 59a is inserted into a coil connection groove 54d of the wiring box 54c, and then the mag mate terminal 85 is pressed into the wiring box 54c. Accordingly, the mag mate terminal 85 plays a role of fixing the U-phase coil 59a in the wiring box 54c, as well as serving as a medium for an electrical connection between the fork pin 81a and the U-phase coil 59a. Subsequently, if the fork pins 81a, 82a, and 83a of the electric power terminal block 80 are respectively inserted into the mag mate terminal 85 that has been pressed into the wiring box 54c, the terminal pins 81, 82, and 83 of the electric power terminal block 80 are connected with the coils 59a-59c, respectively.

In addition, referring to FIG. 10, the other end terminals of the coils 59a-59c are inserted into the wiring box 54c of any one of three division stator cores 51 from which the other end terminals of the respective coils 59a-59c are withdrawn so that U-, V-, and W-phase coils are mutually connected with one another to thus form a neutral point (NP), and then a mag mate terminal 86 for a common terminal is pressed into the wiring box 54c.

In the present invention, a connector for connection with a main body of a washing machine is integrally formed at one side of the electric power terminal block 80, and three-phase terminal pins 81-83 of the connector are simply connected using the wiring box. The three-phase terminal pins 81-83 of the connector are made of a plate-shaped metal body, respectively. Accordingly, it is excellent to handle the three-phase terminal pins 81-83 during assembly, to thus prevent an inferiority problem from occurring.

FIG. 11 is a plan view showing a state where a sensor printed circuit board (PCB) holder is combined with a division stator core assembly.

The division stator core assembly 2 whose wiring has been completed as described above is put into a mold, and insert-molded using a resin for a Bulk Molding Compound (BMC), to thereby form a stator holder 52 as shown in FIG. 11. Here, since the electric power terminal block 80 has a structure that the middle portion of the three terminal pins 81-83 respectively made of the metal body is molded by the body 80a made of resin when the electric power terminal block 80 is insert-molded together with a number of the division stator cores 51, an assembly work and a molding work of the stator core assembly 2 become easy in comparison with the conventional art that uses flexible lead wires.

If the respective division stator cores 51 are insert-molded with a Bulk Molding Compound (BMC) except the division cores 53 that have been exposed to the outside of the respective division stator cores 51, in order to cover spaces between the respective division stator core assemblies 2, the upper/lower wound coil portions, and the bobbins 54, to thereby obtain an annular built-in type stator 50.

Another thermosetting resin can be used other than the BMC for the insert molding.

Referring to FIG. 11, a number of coupling holes 53a-53d are formed in the outer side of the stator holder 52 at the time of an insert-molding.

Subsequently, in order to fix the sensor PCB holder 90 on part of the stator holder 52, snap coupling protrusions 91a-91d that are protrudingly formed in the sensor PCB holder 90 are snap-coupled with a number of the coupling holes 53a-53d.

In this case, the sensor PCB holder 90 includes a Hall IC (Integrated Circuit) assembly 93 that generates a position signal for detecting position of a rotating rotor 60 in order to control a current supply for the coils of the stator 50 of the three-phase drive system, and the Hall IC assembly 93 is mounted on the sensor PCB 94 to then be connected to three Hall sensors 95a-95c.

The sensor PCB holder 90 is fixed on the stator holder 52, to thus complete production of a stator 50.

In the case of the stator 50 shown in FIG. 11, the stator holder 52 includes a number of axially extending protrusions 52a having bolt engagement holes 43 needed to be engaged with fixing bolts 41 and guide projections 42 for guiding assembly positions during performing an assembly with a main body of a washing machine, that is, a tub 40.

As described above, since a PCB (Printed Circuit Board) for assembling division cores or an assembly holder for mutually connecting coil terminals and electric power terminals that affect thickness of a stator are not used when a number of division stator cores 51 are assembled, the stator according to the present invention can ensure minimization of the thickness that is required for a slim structure.

Figure 12:
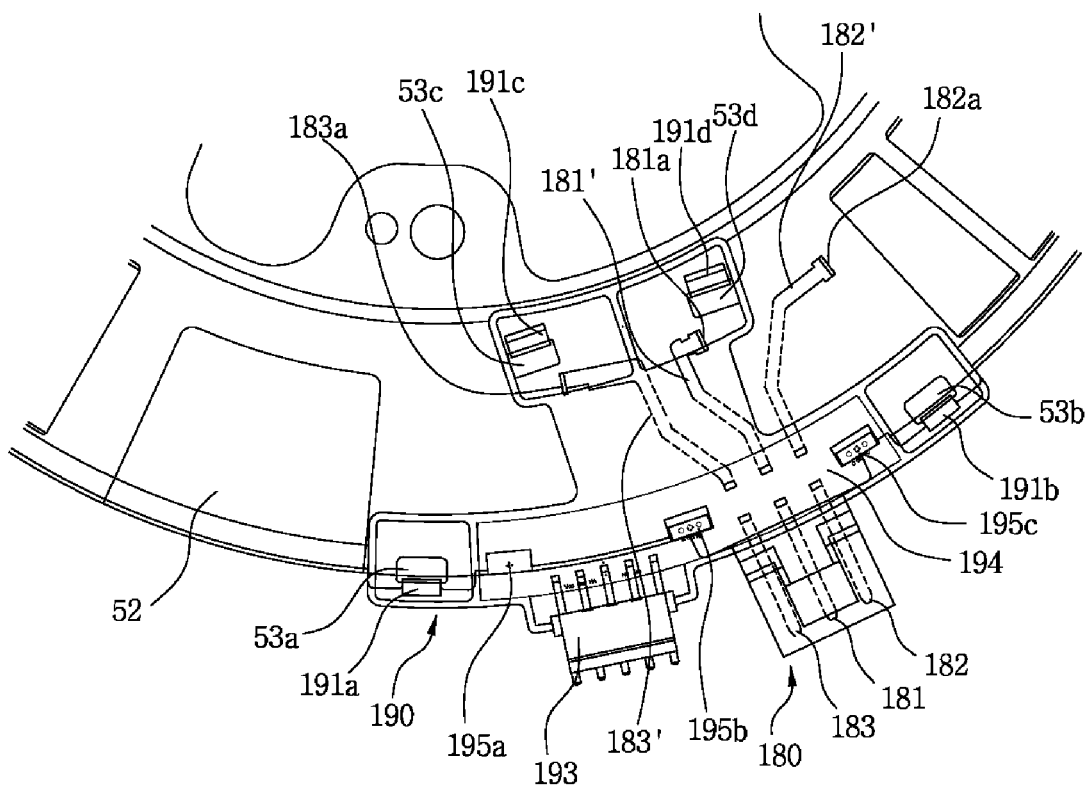
FIG. 12 is a partial enlarged view showing a state where a sensor printed circuit board (PCB) that is integrally formed with an electric power terminal block is combined with a stator.

Meanwhile, as described above, the electric power terminal block 80 can be used to be separated from the sensor PCB holder 90, but is not limited thereto. As shown in FIG. 12, it is possible to be transformed into an integral type into which the electric power terminal block 180 and the sensor PCB holder 190 are integrated.

In other words, referring to FIG. 12, in the case of the electric power terminal block 180, first terminal pins 181-183 that are disposed in the inner portion of the electric power terminal block 180 are respectively connected by soldering and extended on and from one side of a sensor PCB 190, and second terminal pins 181'-183' are connected by soldering and extended on and from the other side of the sensor PCB 194. Fork pins 181a-183a are formed at the ends of the second terminal pins 181'-183', respectively.

In this case, the second terminal pins 181'-183' are insert-molded together with a number of division core assemblies at a state where the second terminal pins 181'-183' are connected with the three-phase (U, V and W) coils, respectively. Here, the other ends of the second terminal pins 181'-183' are bent upwards so as to be easily soldered on the other side of the sensor PCB 194, to thereby maintain a state where the second terminal pins 181'-183' that have been insert-molded are exposed to the outside of a core support, that is, a stator holder 52, after performing an insert-molding work.

In addition, the other ends of the second terminal pins 181'-183' are inserted into and protruded from throughholes that are formed on the other side of the sensor PCB 194 on the sensor PCB holder 190.

Thus, in the case of a monolithic structure shown in FIG. 12, the second terminal pins 181'-183' are insert-molded together with a number of division core assemblies at a state where the second terminal pins 181'-183' have been connected with the three-phase (U, V and W) coils, respectively. Thereafter, when the sensor PCB holder 190 is snap-coupled with a number of coupling holes 53a-53d of the stator holder 52, the other ends of the second terminal pins 181'-183' are inserted into and protruded from throughholes that are formed on the other side of the sensor PCB 194 and are connected with an electric power supply circuit by soldering.

The sensor PCB holder 190 holds the sensor PCB 194 on which a number of snap coupling protrusions 191a-191d that are snap-coupled with a number of coupling holes 53a-53d of the stator holder 52, a Hall IC assembly 193 and three Hall sensors 195a-195c are mounted, in the manner as that of the above-described sensor PCB holder 90.

C. Structure of Rotor and Process of Manufacturing the Rotor

Figure 5:
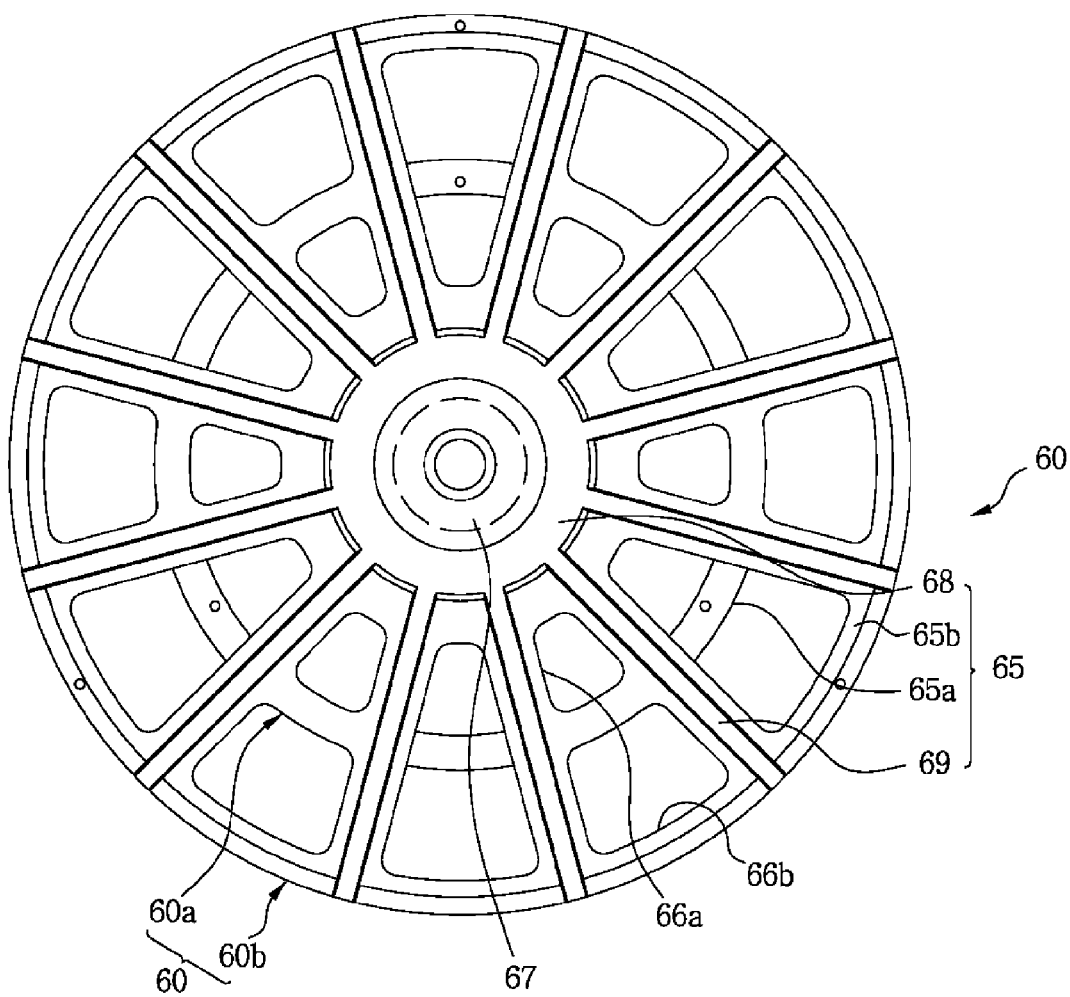
FIG. 5 is a plan view of a rotor according to the present invention.

Referring to FIGS. 1, 4 and 5, a rotor 60 is manufactured by an insert-molding method with a thermosetting resin, for example, BMC (Bulk Molding Compound), at a state where a rotating shaft coupling bushing 67 is disposed on an injection molding mold so as to be substantially positioned at the center of gravity of the inner rotor 60a and the outer rotor 60b.

The inner rotor 60a and the outer rotor 60b are connected by a rotor holder 65 made of a thermosetting resin so as to maintain a state where a number of magnets 63 and 62 are arranged on the ring-shaped yokes 61 and 64 as illustrated in the cross-sectional view of FIG. 1. As a result, a trench type groove 65a into which a leading portion of the stator 50 is inserted is formed between the inner rotor 60a and the outer rotor 60b.

Therefore, the rotor holder 65 includes: a pair of annular frames 65a and 65b that surround upper/lower surfaces exclusive of surfaces respectively facing a number of magnets 63 and 62 in the inner rotor 60a and the outer rotor 60b and outer circumference portions of ring-shaped yokes 61 and 64; a linear frame 69 that crosses the pair of the annular frames 65a and 65b and is extended radially linearly toward the central portion of the rotor 60; and a bushing holder 68 that holds a bushing 67 therein and with the outer circumference portion of which a leading end of the linear frame 69 is connected. These are integrally formed by a thermosetting resin.

The bushing 67 that is located at the central portion of the rotor holder 65 has a serration structure in the inner circumference thereof in order to effectively transfer a rotating force of the rotor 60 to the rotating shaft 70 during rotation of the rotor 60, and is combined with the rotating shaft 70.

Referring to FIG. 1, in the case of the double rotor 60, the inner rotor 60a is formed by alternately arranging a number of magnets 63 that are respectively magnetized into a N-pole and a S-pole on the outside of the annular inner yoke 64 using adhesives, and the outer rotor 60b is formed by alternately arranging a number of magnets 62 that are respectively magnetized into a N-pole and a S-pole on the inside of the annular outer yoke 61 using adhesives. In this case, the magnets facing in the inner rotor 60a and the rotor 60b are arranged to have for example a reverse polarity to each other.

At the time of performing the insert-molding, the outer side surfaces of the inner rotor 60a and the outer rotor 60b are molded in an annular form except the facing surfaces of the facing magnets. Here, in the case of the rotor holder 65, the pair of the annular frames 65a and 65b and the linear frame 69 cross each other and are connected with each other. As a result, a number of throughholes 66a and 66b that play a role of air circulation paths are formed between the inner rotor 60a and the outer rotor 60b, and between the inner rotor 60a and the bushing holder 68, respectively. The throughholes 66a and 66b transfer external air to the magnets of the inner rotor 60a and the outer rotor 60b and the stator 50 when the rotor 60 rotates, to thereby enhance a cooling performance.

In addition, in the case of the rotor 60 according to the present invention, since a number of magnets 63 and 62 of the inner rotor 60a and the outer rotor 60b are arranged in a concentric circle by an insert-molding method, a roundness of the rotor 60 becomes high, to thus be capable of maintaining a uniform magnetic gap when the rotor 60 is assembled with the stator 50.

Therefore, as described above, the rotor 60 and the stator 50 are designed into a slim type in this invention, respectively. Accordingly, overall thickness that is, height of a motor 1 can be reduced by mixing a slim type structure of the rotor 60 and the stator 50 in combination.

Further, according to the present invention, lead wires are omitted when three-phase coils 59a-59c are connected with an electric power terminal block 80 and the three-phase coils 59a-59c are directly connected with fork pins 81-83 of the electric power terminal block 80 using a wiring box 54c that is formed integrally with a bobbin 54 of respective division cores 51. Accordingly, connection between the three-phase coils 59a-59c and the electric power terminal block 80 facilitates. In addition, since the electric power terminal block 80 is insert-molded together with a number of division cores 51, a molding work that has been difficult due to conventional flexible lead wires can smoothly proceed, to thus greatly improve a workability.

In addition, in this invention, cores of the stator 50 are manufactured into perfect division stator cores in order to enhance a coil winding workability. Further, the double rotor 60 is employed in the present invention, to thereby enhance an efficiency of the magnetic circuit.

Further, in this invention, termination processing of the three-phase coils 59a-59c is performed, and a successive winding method is applied for each division core per phase to thereby avoid connection of coils between division cores, and to thus realize a stator in a slim structure.

In addition, in spite of the slim type structure of the rotor and stator in the present invention, the number of slots that is, division cores and the number of poles that is, magnets are increased by increasing diameters of the rotor and the stator without reducing size of the respective magnets and division cores, to thereby implement a double-rotor/single-stator structure. Accordingly, in comparison with a general large-capacity motor of a single-rotor/single-stator structure, an efficiency and torque of the motor can be further increased.

As a result, in the case of a general motor of a single-rotor/single-stator structure, the maximum torque is 32 Nm, and the motor efficiency is 27.6%. However, the motor of the present invention has a slim type structure, and exhibits a high driving torque of the maximum torque of 42 Nm and a high efficiency of 44%.

In addition, this invention can provide a slim type motor that is embodied into thickness or height of about 25 mm or below, and thus can embody a direct drive (DD) apparatus that is employed in a motor installation space that is given in the inside of a built-in type medium-size/small-size drum-washing machine, to thus rotationally drive a basket in the inside of the tub in a direct drive (DD) manner.

In addition, since the division stator core 51 is small, a waste rate of a silicon steel plate is smaller than that of a built-in type stator core structure. Accordingly, there is little material loss. Further, since shape of the division stator cores 51 is simple, it is easy to manufacture the division stator core 51. In addition, since it is possible to perform coil-winding of the division stator cores 51 using a general-purpose winding machine, an investment cost ratio between a coil winding cost and a winding machine is reduced.

Moreover, since the rotor and the stator are formed of a built-in type structure by using resins in the above-described embodiments of the present invention, they are of an excellent durability and an excellent moisture-proof performance. Accordingly, the rotor and the stator according to the above-described embodiments of the present invention are appropriate for a drum drive source of a washing machine that is used under a high humidity environment, but are not limited thereto. In addition, it is possible to modify a structure of mounting a stator according to an apparatus employing a motor.

The present invention is applicable for a slim type stator, a method of making the same, a slim type motor having the same, and a direct drive apparatus for use in a drum-washing machine, in which a BLDC (Brushless DC) motor having a stator of a division core structure and double rotors is fabricated for the drum-washing machine.

The present invention has been described in detail with respect to the embodiments but is not limited to the above-described embodiments. It is apparent to one who has an ordinary skill in the art that there may be a number of modifications and variations within the same technical spirit of the invention. It is natural that the modifications and variations belong to the following appended claims.

What is claimed is:

1. A slim type stator for use in a brushless direct-current (BLDC) motor, the slim type stator comprising:
a division stator core assembly in which coils are successively wound in a number of bobbins that are alternately disposed per phase on respective outer circumferences of a number of division cores of which the bobbins are formed and a coupling groove and a coupling protrusion are combined with each other between adjoining division core bobbins and assembled in an annular form;
a stator holder that supports the division stator core assembly by mutually connecting resin; and
an electric power terminal block that is insert-molded together with the stator holder at a state where one end of the electric power terminal block is connected to an output terminal of each coil per phase, respectively, and whose other end is exposed to the outside of the stator holder,
wherein a wiring box into which the output terminal of each coil is inserted is integrally formed with each bobbin,
the electric power terminal block comprises a number of terminal pins whose one ends are detachably connected with external power supply terminals and on the other ends of which fork pins are formed, and
each fork pin of the number of the terminal pins is inserted into the wiring box into which the output terminal of each coil has been inserted, and is connected with the output terminal of each coil per phase.

2. The slim type stator for use in a brushless direct-current (BLDC) motor according to claim 1, wherein the coils per phase that are inserted into the wiring box are fixed by inserting mag mate terminals into the wiring box, respectively, and
the fork pins are pressingly fitted into the mag mates to then be electrically connected to each coil.

3. A slim type stator for use in a brushless direct-current (BLDC) motor, the slim type stator comprising:
a division stator core assembly in which coils are successively wound in a number of bobbins that are alternately disposed per phase on respective outer circumferences of a number of division cores of which the bobbins are formed and a coupling groove and a coupling protrusion are combined with each other between adjoining division core bobbins and assembled in an annular form;
a stator holder that supports the division stator core assembly by mutually connecting resin; and
a sensor printed circuit board (PCB) holder that is detachably combined with the stator holder and comprises a sensor printed circuit board (PCB) on which a number of Hall sensors and a Hall sensor assembly are mounted, as well as an electric power terminal block whose one end is connected to a coil per phase,
wherein a wiring box into which the output terminal of each coil is inserted is integrally formed with each bobbin, and
the electric power terminal block comprises:
a number of first terminal pins that are detachably connected with external electric power terminals therein; and
a number of second terminal pins that are buried into the stator holder and whose leading end portions are connected with a number of fork pins that are inserted into a wiring box so as to be connected to one end of a coil per phase.

4. The slim type stator for use in a brushless direct-current (BLDC) motor according to claim 3, wherein the number of the first and second terminal pins are mutually connected through the sensor PCB, respectively.

5. A direct drive apparatus for use in a drum-washing machine, the direct drive apparatus comprising:
a rotating shaft that is rotatably combined with a tub of the drum-washing machine and on the leading end of which a basket is fixedly combined;
a double-rotor unit comprising inner and outer rotors in which a number of N-pole and S-pole magnets are respectively disposed, the inner and outer rotors being mutually connected by a rotor holder, and whose inner circumference is extensively formed in a bushing combined with the rotating shaft; and
a stator whose one end is disposed between the inner rotor and the outer rotor and whose other end is mounted in the tub, in which coils are successively wound per phase in a number of bobbins that are formed on respective outer circumferences of a number of division cores and mutually connected between adjoining bobbins, and terminal pins of an electric power terminal block are connected with an output terminal of each coil per phase by using a wiring box that is provided in each bobbin,
wherein the stator comprises a stator holder that mutually connects a number of division stator cores around which coils are wound with the outer circumference of the bobbins, and
the stator holder comprises a number of protrusions that are axially extended so that a number of bolt engagement holes that are used to engage fixing bolts at the time of being assembled with the tub and a number of guide protrusions for guiding an assembly position are alternately formed at intervals.

6. The direct drive apparatus for use in a drum-washing machine, according to claim 5, wherein the rotor holder comprises:
a pair of annular frames that surround the outer circumference portions of the number of magnets in the inner rotor and the outer rotor, respectively;
a number of linear frames that cross the pair of the annular frames and are radially extended in a straight line to the center portion of the rotor; and
a bushing holder that holds a bushing therein and with the outer circumference portion of which leading ends of the linear frames are connected.

7. A direct drive apparatus for use in a drum-washing machine, the direct drive apparatus comprising:
a rotating shaft that is rotatably combined with a tub of the drum-washing machine and on the leading end of which a basket is fixedly combined;
a double-rotor unit comprising inner and outer rotors in which a number of N-pole and S-pole magnets are respectively disposed, the inner and outer rotors being mutually connected by a rotor holder, and whose inner circumference is extensively formed in a bushing combined with the rotating shaft; and
a stator whose one end is disposed between the inner rotor and the outer rotor and whose other end is mounted in the tub, in which coils are successively wound per phase in a number of bobbins that are formed on respective outer circumferences of a number of division cores and mutually connected between adjoining bobbins, and terminal pins of an electric power terminal block are connected with an output terminal of each coil per phase by using a wiring box that is provided in each bobbin, wherein the stator comprises
a number of division cores;
a number of bobbins that partially surrounds the number of the division cores;
an electric power terminal block on the outer portion of which a connector is provided in which external electric power is applied through the connector and that has terminal pins that are extended to the inside of the stator from the connector;
a wiring box that is integrally formed with each bobbin and that mutually connects a stator coil with the terminal pins per phase; and
a stator holder that mutually connects a number of division stator cores around which coils are wound with the outer circumference of the bobbins and supports the number of division stator cores.

8. A direct drive apparatus for use in a drum-washing machine, the direct drive apparatus comprising:
a rotating shaft that is rotatably combined with a tub of the drum-washing machine and on the leading end of which a basket is fixedly combined;
a double-rotor unit comprising inner and outer rotors in which a number of N-pole and S-pole magnets are respectively disposed, the inner and outer rotors being mutually connected by a rotor holder, and whose inner circumference is extensively formed in a bushing combined with the rotating shaft; and
a stator whose one end is disposed between the inner rotor and the outer rotor and whose other end is mounted in the tub, in which coils are successively wound per phase in a number of bobbins that are formed on respective outer circumferences of a number of division cores and mutually connected between adjoining bobbins, and terminal pins of an electric power terminal block are connected with an output terminal of each coil per phase by using a wiring box that is provided in each bobbin,
wherein the stator comprises
a number of division cores;
a number of bobbins in which each bobbin comprises first and second flanges that are formed on the outer circumference of each of the number of division cores and surround a middle portion thereof, and formed at one side of the bobbin and the other side thereof, respectively, and
a coupling protrusion and a coupling groove that are provided in both side ends of the first flange that is disposed in the inside thereof during assembling, and are mutually connected between adjoining division stator core bobbins and are disposed in an annular form;
a three-phase coil (U, V, and W) that is consecutively wound on the bobbin of each phase that is alternately arranged per phase (U, V, and W); and
a stator holder that is molded in an annular form by an insert-molding that uses a thermosetting resin, except for inner/outer surfaces of each division core of a division stator core assembly that is assembled by winding the coils on the number of the bobbins.

9. A slim type motor comprising:
a rotating shaft that is rotatably combined with a housing of an apparatus and on the leading end of which a driven object is fixedly combined;
a double-rotor unit comprising inner and outer rotors in which a number of N-pole and S-pole magnets are respectively disposed, the inner and outer rotors being mutually connected by a rotor holder, and whose inner circumference is extensively formed in a bushing combined with the rotating shaft; and
a stator whose one end is disposed between the inner rotor and the outer rotor and whose other end is mounted in the tub, in which coils are successively wound per phase in a number of bobbins that are formed on respective outer circumferences of a number of division cores and mutually connected between adjoining bobbins, and terminal pins of an electric power terminal block are connected with an output terminal of each coil per phase by using a wiring box that is provided in each bobbin,
wherein each bobbin of the stator comprises:
first and second flanges that are formed on the outer circumference of each of the number of division cores and surround a middle portion thereof, and are formed at one side of the bobbin and the other side thereof, respectively;
a coupling protrusion and a coupling groove that are mutually connected between adjoining division stator core bobbins and are assembled in an annular form, at the time of assembling in both side ends of the first flange that is disposed in the inside thereof, and
a wiring box that is integrally formed at the upper side of the first flange and mutually connects the stator coil and the terminal pin per phase.

10. The slim type motor according to claim 9, wherein the rotor holder comprises:
a pair of annular frames that surround the outer circumference portions of the number of magnets in the inner rotor and the outer rotor, respectively;
a number of linear frames that cross the pair of the annular frames and are radially extended in a straight line to the center portion of the rotor; and
a bushing holder that holds a bushing therein and with the outer circumference portion of which leading ends of the linear frames are connected, and wherein a number of throughholes playing a role of air circulation paths are formed between the pair of the annular frames and the bushing holder in which the space between the pair of the annular frames and the bushing holder is divided by the number of the linear frames.

\* \* \* \* \*